(12) United States Patent
Park et al.

(10) Patent No.: US 12,477,208 B2
(45) Date of Patent: Nov. 18, 2025

(54) IMAGE SENSOR AND OPERATING METHOD OF THE IMAGE SENSOR

(71) Applicant: SAMSUNG ELECTRONICS CO., LTD., Suwon-si (KR)

(72) Inventors: Seungin Park, Yongin-si (KR); Jinwoo Son, Seoul (KR); Changyong Son, Anyang-si (KR); Byung In Yoo, Seoul (KR); Sangil Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/644,535

(22) Filed: Apr. 24, 2024

(65) Prior Publication Data

US 2024/0276093 A1 Aug. 15, 2024

Related U.S. Application Data

(63) Continuation of application No. 17/407,463, filed on Aug. 20, 2021, now Pat. No. 11,997,376.

(30) Foreign Application Priority Data

Mar. 17, 2021 (KR) .................. 10-2021-0034845

(51) Int. Cl.
*H04N 23/61* (2023.01)
*G06K 19/06* (2006.01)
*G06T 7/246* (2017.01)
*G06V 40/16* (2022.01)
*H04N 23/60* (2023.01)

(52) U.S. Cl.
CPC ............ *H04N 23/61* (2023.01); *G06T 7/248* (2017.01); *G06T 7/251* (2017.01); *H04N 23/64* (2023.01); *G06K 19/06103* (2013.01); *G06V 40/16* (2022.01)

(58) Field of Classification Search
CPC ........ H04N 23/61; H04N 23/64; G06T 7/251; G06T 7/248; G06V 40/16
USPC ...................................................... 348/222.1
See application file for complete search history.

(56) References Cited

U.S. PATENT DOCUMENTS

| 9,167,221 B2 | 10/2015 | Grundmann et al. |
| 10,681,313 B1 | 6/2020 | Day |
| 10,789,821 B2 | 9/2020 | Laska et al. |

(Continued)

FOREIGN PATENT DOCUMENTS

| KR | 10-2004-0018586 A | 3/2004 |
| KR | 10-0686310 B1 | 2/2007 |

(Continued)

OTHER PUBLICATIONS

Korean Office Action issued on Jun. 7, 2022, in counterpart to Korean Patent Application No. 10-2021-0034845 (3 Pages in English, 6 pages in Korean).

(Continued)

Primary Examiner — Joel W Fosselman
(74) Attorney, Agent, or Firm — NSIP Law

(57) ABSTRACT

An image sensor includes: a motion detection circuit configured to detect a motion in image frames; and a micro control unit (MCU) configured to adjust at least a portion of a target frame among the image frames based on whether the motion is detected, and detect whether a target object is present based on the adjusted portion of the target frame.

15 Claims, 10 Drawing Sheets

(56) References Cited

U.S. PATENT DOCUMENTS

| | | |
|---|---|---|
| 2007/0065134 A1 | 3/2007 | Sugimoto |
| 2014/0044404 A1 | 2/2014 | Grundmann et al. |
| 2014/0185938 A1* | 7/2014 | Tamayama ........... H04N 19/521 |
| | | 382/195 |
| 2016/0037071 A1 | 2/2016 | Emmett et al. |
| 2017/0302719 A1 | 10/2017 | Chen et al. |
| 2017/0332107 A1* | 11/2017 | Abbas .................... H04N 19/85 |
| 2018/0173933 A1* | 6/2018 | Gousev ................ G06V 40/193 |
| 2018/0204867 A1 | 7/2018 | Kim et al. |
| 2018/0217223 A1 | 8/2018 | Kumar et al. |
| 2019/0035241 A1 | 1/2019 | Laska et al. |
| 2019/0130594 A1 | 5/2019 | Seyfi et al. |
| 2019/0138795 A1 | 5/2019 | Vaidya |
| 2019/0354194 A1 | 11/2019 | Wang et al. |
| 2020/0042776 A1 | 2/2020 | Shen et al. |
| 2020/0151884 A1 | 5/2020 | Vajapey et al. |
| 2020/0257892 A1 | 8/2020 | Agarwal et al. |
| 2020/0311388 A1 | 10/2020 | Xiang |
| 2020/0396367 A1 | 12/2020 | Segapelli et al. |
| 2021/0232292 A1 | 7/2021 | Selig et al. |
| 2021/0303846 A1* | 9/2021 | Yoneyama .............. G06T 7/248 |

FOREIGN PATENT DOCUMENTS

| | | |
|---|---|---|
| KR | 10-2011-0119145 A | 11/2011 |
| KR | 10-2018-0087532 A | 8/2018 |
| KR | 10-2020-0036093 A | 4/2020 |
| KR | 10-2020-0067682 A | 6/2020 |
| KR | 10-2020-0119372 A | 10/2020 |
| KR | 10-2020-0125527 A | 11/2020 |

OTHER PUBLICATIONS

Korean Office Action issued on Aug. 4, 2022, in counterpart Korean Patent Application No. 10-2021-0034845 (3 Pages in English, 5 Pages in Korean).

* cited by examiner

IMAGE SENSOR AND OPERATING METHOD OF THE IMAGE SENSOR

CROSS-REFERENCE TO RELATED APPLICATIONS

This application is continuation of application Ser. No. 17/407,463 filed on Aug. 20, 2021, which claims the benefit under 35 USC § 119(a) of Korean Patent Application No. 10-2021-0034845 filed on Mar. 17, 2021, in the Korean Intellectual Property Office, the entire disclosure of which is incorporated herein by reference for all purposes.

BACKGROUND

1. Field

The following description relates to an image sensor and an operating method of the image sensor.

2. Description of Related Art

Various operations associated with artificial intelligence (AI) may be performed in a user terminal to improve user convenience. An AI algorithm may need a great amount of memory and computation and may thus be performed through a standalone server or a cloud service. However, due to such need for the great amount of memory and computation, the AI algorithm may not be readily performed or implemented in a user terminal such as a smartphone.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image sensor includes: a motion detection circuit configured to detect a motion in image frames; and a micro control unit (MCU) configured to adjust at least a portion of a target frame among the image frames based on whether the motion is detected, and detect whether a target object is present based on the adjusted portion of the target frame.

The MCU may be configured to: determine whether the target object is present in the target frame by converting an operation mode from a first mode to a second mode in response to the motion being present, and generate a trigger signal for an application processor in response to the target object being present.

The MCU may include: a determination module configured to determine whether the motion is present and convert an operation mode; an adjustment module configured to adjust the portion of the target frame in response to the motion is present; and an object detector configured to detect whether the target object is present based on the adjusted target frame.

The determination module may be configured to convert the operation mode by changing state information of a state machine in response to the motion being present.

For adjusting of the portion of the target frame, the adjustment module may be configured to perform any one or any combination of any two or more of: a crop operation to extract a target portion corresponding to a local motion in the target frame; a brightness correction operation on the target portion using pixel information of the target portion; and a rotation operation on the target portion of the target frame based on a global motion in the target frame.

For the performing of the rotation operation, the adjustment module may be configured to: estimate a rotation angle of the image sensor based on the global motion; and rotate the target portion to be in an upright position based on the rotation angle.

The object detector may include: a neural network trained to detect whether the target object is present based on the adjusted target frame.

The motion detection circuit may be configured to detect either one of or both of: a global motion based on a movement of the image sensor and a motion of the image sensor; and for the detecting of the motion in the image frames, a local motion based on a motion of the target object in the image frames.

For the detecting of the local motion, the motion detection circuit may be configured to: calculate a motion field based on a first image frame corresponding to a first time and a second image frame corresponding to a second time after the first time among the image frames; and separate a portion in which the local motion is observed in the motion field.

The image sensor may include either one of or both of: a preprocessing circuit configured to perform preprocessing for image quality improvement on the image frames; and an analog-to-digital converter (ADC) configured to convert an analog signal of the image frames to a digital signal.

The target object may include either one of a user's face and a quick response (QR) code.

A user terminal may include: the image sensor; an application processor configured to be activated by a trigger signal, wherein the MCU may be configured to generate the trigger signal; and a memory configured to store a trained neural network model, wherein the MCU may be configured to detect whether the target object is present using the trained neural network.

In another general aspect a user terminal includes: an image sensor configured to detect a motion in image frames, adjust at least a portion of a target frame among the image frames based on whether the motion is detected, detect whether a target object is present based on the adjusted portion of the target frame, using a neural network model trained to detect whether the target object is present, and generate a trigger signal; an application processor configured to be activated by the trigger signal; and a memory configured to store the neural network model.

In another general aspect, an operating method of an image sensor includes: determining whether a motion is present in image frames; adjusting at least a portion of a target frame among the image frames based on whether the motion is present; and detecting whether a target object is present based on the adjusted portion of the target frame.

The adjusting of the portion may include any one or any combination of any two or more of: performing a crop operation to extract a target portion corresponding to a local motion in the target frame; performing a brightness correction operation on the target portion using pixel information of the target portion; and performing a rotation operation on the target portion of the target frame based on a global motion in the target frame.

The performing of the rotation operation may include: estimating a rotation angle of the image sensor based on the global motion; and rotating the target frame to be in an upright position based on the rotation angle.

The determining whether the motion is present may include: converting an operation mode from a first mode to a second mode by changing state information of a state machine based on whether the motion is present.

The detecting whether the target object is present may include: detecting whether the target object is present based on the adjusted portion of the target frame using a neural network trained to detect whether the target object is present.

The method may include: generating a trigger signal for an application processor in response to the target object being present.

The target object may include either one of a user's face and a quick response (QR) code.

A non-transitory computer-readable storage medium may store instructions that, when executed by a processor, configure the processor to perform the method.

In another general aspect, an operating method of an image sensor includes: in response to determining that motion is present in image frames, converting an operation mode of the image sensor from a motion detection mode to an object detection mode; in response to the conversion to the object detection mode, adjusting a target frame among the image frames for input to a neural network, and detecting whether a target object is present by inputting the adjusted target frame to the neural network.

The conversion from the motion detection mode to the object detection mode may include activating one or more portions of a micro control unit (MCU) of the image sensor.

The adjusting of the target frame and the detecting of whether the target object is present may be performed using the activated one or more portions of the MCU.

The method may include transmitting a trigger signal to activate an application processor of a user terminal in response to detecting that the target object is present.

Other features and aspects will be apparent from the following detailed description, the drawings, and the claims.

Figure 1:
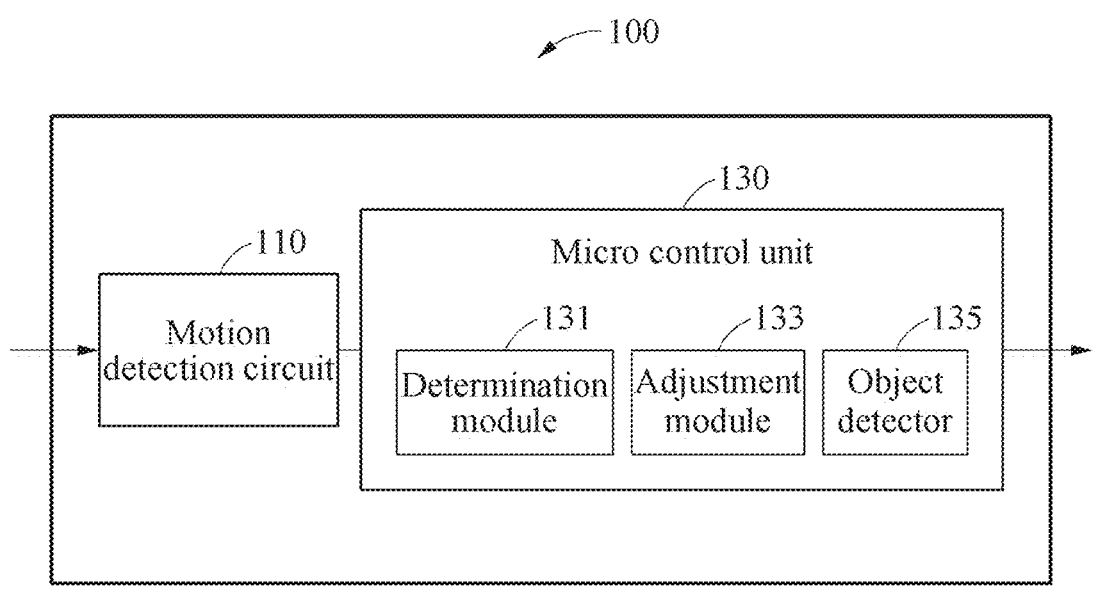
FIG. 1 illustrates an example of a configuration of an image sensor.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 illustrates an example of a configuration of an image sensor. Referring to FIG. 1, an image sensor 100 may include a motion detection circuit 110 and a micro control unit (MCU) 130. The image sensor 100 may be, for example, an always-on (AON) image sensor system that operates permanently.

The motion detection circuit 110 may sense and/or detect a motion in image frames. Motion detection described herein is indicated as "MD" in the drawings. The motion detection circuit 110 may detect either one or both of a global motion that is from a motion of a device (e.g., the image sensor 100 or a camera) configured to capture image frames and a local motion that is from a motion of a target object in the image frames. A motion of the image sensor 100 may include a movement of the image sensor 100 and/or a rotation of the image sensor 100. Information associated with the global motion and information associated with the local motion may be generated in the motion detection circuit 110 or the MCU 130.

The motion detection circuit 110 may detect a motion in the image frames as described hereinafter.

For example, the motion detection circuit 110 may detect a motion by estimating an optical flow corresponding to a motion pattern of an object in the image frames. The optical flow may correspond to a distribution of directions and distances of movements of pixels between a previous frame and a subsequent frame of the image frames. The motion detection circuit 110 may detect or predict a motion of an object in images by calculating how much the object moves in which direction based on the optical flow. The optical flow may be based on an assumption that i) pixel intensity of the object moving between consecutive frames remains unchanged and ii) neighboring pixels move in a similar pattern. For example, the motion detection circuit 110 may calculate a motion field based on a first image frame corresponding to a first time and a second image frame corresponding to a second time after the first time among the image frames. The motion detection circuit 110 may separate an area in which a local motion is observed in the motion field. The motion detection circuit 110 may extract a portion (or a target portion) in a target frame corresponding to the area in which the local motion is observed in the motion field and transmit the extracted target portion to the MCU 130. The target frame described herein may be construed as an image frame in which a local motion is detected among a plurality of image frames.

For another example, the motion detection circuit 110 may detect a motion using homographies corresponding to the image frames. The motion detection circuit 110 may detect the motion using a feature-based method of estimating homographies based on a correspondence between feature points of the image frames or an indirect method such as a featureless method of estimating homographies based on intensity of the image frames.

The MCU 130 may adjust at least a portion of a target frame among the image frames based on whether the motion is detected by the motion detection circuit 110. The MCU 130 may detect whether a target object is present based on the adjusted portion of the target frame. The target object may be, for example, any one of a user's face and a quick response (QR) code, but is not limited to the foregoing examples. An operation of the MCU 130, which is to be further described hereinafter, may be implemented in a form of software (e.g., firmware (FW)) so that image adjustment and/or object detection that consumes a relatively great amount of computation is performed more rapidly with less power consumption. Hereinafter, for the convenience of description, a face of a user will be mainly described as an example of a target object. However, a QR code is not excluded as an example of the target object, and the same operations may be performed as necessary even when the target object is the QR code.

For example, the MCU 130 may determine whether the target object is present in the target frame by converting an operation mode from a first mode to a second mode based on whether the motion is present. In this example, the first mode may be a motion detection mode (or an MD mode as illustrated) and the second mode may be a face presence detection mode (or an FPD mode as illustrated), but examples of which are not limited thereto. The face presence detection mode may also be referred to herein as an object detection mode.

Hereinafter, non-limiting example operations of the image sensor 100 in each operation mode will be described in more detail with reference to FIGS. 2 through 5.

The MCU 130 may generate a trigger signal for an application processor (or AP as illustrated) based on whether the target object is present.

In an example, the MCU 130 may include a determination module 131, an adjustment module 133, and an object detector 135.

The determination module 131 may determine whether a motion is present in the image frames and convert the operation mode. For example, the determination module 131 may convert the operation mode by changing state information of a state machine based on whether the motion is present in the image frames or based on the operation mode.

The adjustment module 133 may adjust at least a portion (e.g., the target portion) of the target frame based on the operation mode converted by the determination module 131. For example, the adjustment module 133 may perform any one or any combination of a crop operation to extract the target portion corresponding to a local motion in the target frame, a brightness correction operation on the target portion using pixel information of the target portion, and a rotation operation on the target portion of the target frame based on a global motion in the target frame, but examples of which are not limited thereto.

The brightness correction operation may be performed by a contrast stretching technique, a histogram equalization technique, and/or a mean translation technique, for example. The contrast stretching technique may refer to a method of spreading a histogram of a contrast value distribution of a low contrast image to have the contrast value distribution of a wider range. The contrast stretching technique may adjust brightness of an image at a fixed ratio using a ratio of minimum and maximum values of a pixel in the image. The histogram equalization technique may refer to a method of uniformly distributing pixel values of an image to fill all possible areas in the entire image. To uniformly distribute the pixel values of the image, a uniform function and a gaussian function may be used. A non-limiting example of the mean translation technique will be further described hereinafter with reference to FIG. 3.

The adjustment module 133 may estimate a rotation angle of the image sensor 100 or a capturing device based on a global motion in the target frame and rotate the target portion based on the estimated rotation angle to allow the target portion to be in an upright position.

The object detector 135 may detect whether the target object is present from the adjusted portion of the target frame adjusted by the adjustment module 133 or a target frame of which the target portion is adjusted by the adjustment module 133. The object detector 135 may include a neural network trained to detect whether the target object is present from the target frame adjusted by the adjustment module 133. The neural network may be a deep learning-structured neural network, for example.

According to examples, the image sensor 100 may crop the portion of the target frame among the image frames based on whether the motion is present in the image frames. In such a case, the adjustment module 133 may perform the brightness correction operation and/or the rotation operation described in the foregoing on the cropped portion to improve illuminance and/or backlighting.

Figure 2A:
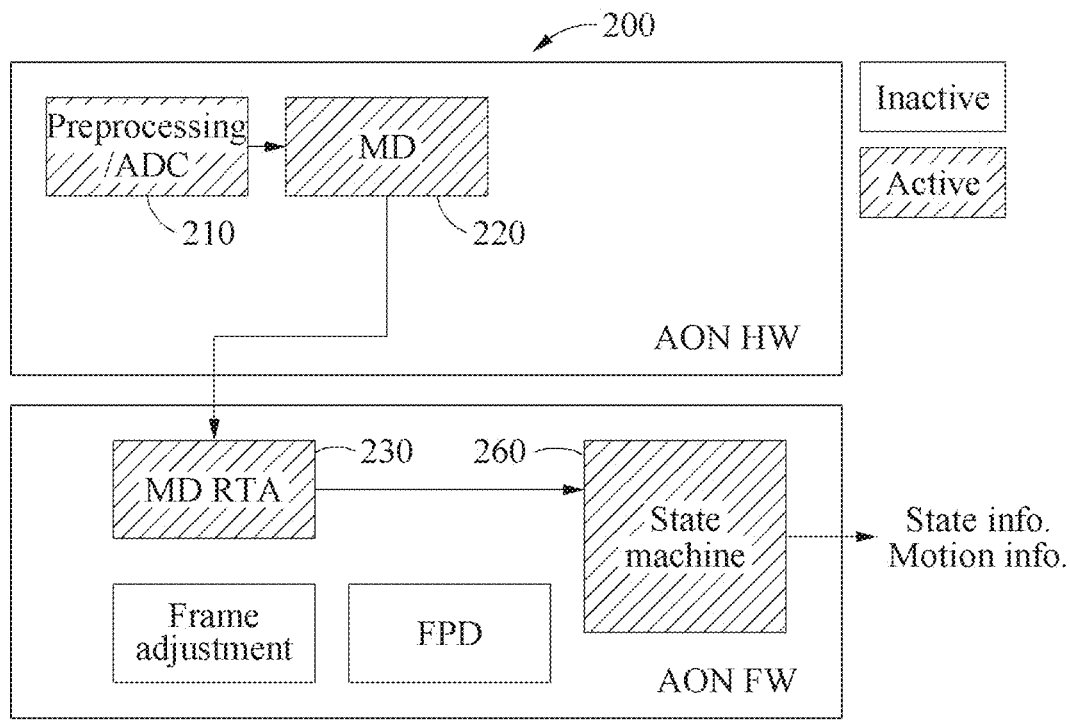
FIGS. 2A and 2B illustrate examples of an operation in each operation mode of an image sensor.
Figure 2B:
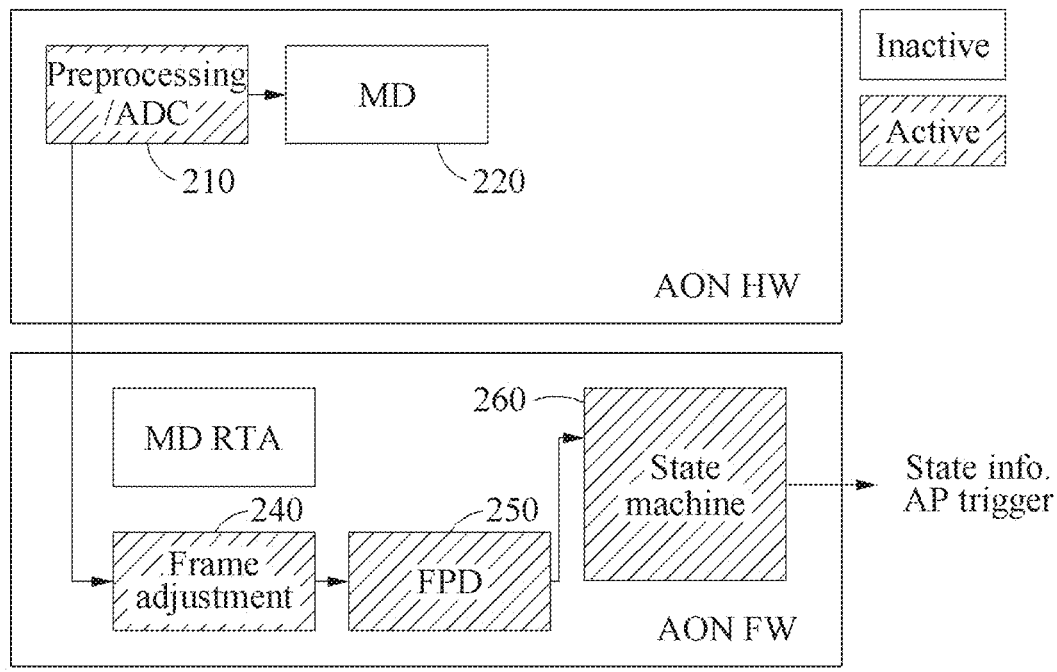

FIGS. 2A and 2B illustrate examples of an operation in each operation mode of an image sensor. In the examples of FIGS. 2A and 2B, illustrated are a configuration of an image sensor 200 including hardware (HW) and firmware (FW) and an operation of the image sensor 200 in each operation mode. In the examples of FIGS. 2A and 2B, hatched blocks may indicate activated components and white or unfilled blocks may indicate inactivated components. The hatched blocks may be understood as activated components unless otherwise described.

The image sensor 200 may rapidly process an operation that is generally performed on image frames (for example, image quality improvement) with the operation configured in HW. Also, the image sensor 200 may rapidly process various additional functions (for example, image adjustment and object detection) with less power consumption, with the functions configured in software (SW) (e.g., FW) provided in a memory (e.g., read-only memory (ROM)).

In an example, the image sensor 200 may include a preprocessing/analog-to-digital converter (ADC) module 210, a motion detection (MD) module 220, a motion detection real-time application (MD RTA) module (or simply an application module 230), a frame adjustment module 240, a face presence detector (FPD) 250, and a state machine 260. In the examples of FIGS. 2A and 2B, the preprocessing/ADC module 210 and the motion detection module 220 may be implemented as HW, and the MD RTA module 230, the frame adjustment module 240, and the face presence detector 250 may be implemented as or using FW. In an example, the face presence detector 250 may correspond to an example of the object detector 135 illustrated in FIG. 1. For the convenience of description, an operation of the face presence detector 250 will be mainly described hereinafter with reference to FIGS. 2A and 2B, but examples of which are not limited thereto. According to examples, various object detectors such as a QR code detector may be used in lieu of the face presence detector 250.

Referring to FIG. 2A, the image sensor 200 may operate in a motion detection mode that is rapidly processed with a relatively small amount of computation. In the motion detection mode, the preprocessing/ADC module 210, the motion detection module 220, the MD RTA module 230, and the state machine 260 may be activated.

In the motion detection mode, the image sensor 200 may convert image frames with improved image quality to a digital signal through the preprocessing/ADC module 210 and transmit the digital signal to the motion detection module 220. The preprocessing/ADC module 210 may include a preprocessing circuit configured to perform preprocessing to improve image quality of the image frames and an ADC configured to convert an analog signal of the image frames to a digital signal.

The motion detection module 220 may sense and/or detect a motion in an image using two or more consecutive image frames converted to digital signals. During the detection of a motion, the motion detection module 220 may detect or estimate a global motion that is from a movement or a rotation of a device (e.g., the image sensor 200 or a camera) configured to obtain the image frames and a local motion that is from a motion of a target object in an image. The image sensor 200 may transmit information associated with the global motion or the local motion detected by the motion detection module 220 to FW of a microprocessor unit. In an example, the motion detection module 220 may correspond to the motion detection circuit 110 illustrated in FIG. 1.

When the MD RTA module 230 receives the information associated with the global motion and the local motion from the motion detection module 220, the MD RTA module 230 may determine whether a motion is present in an image. The MD RTA module 230 may convert the operation mode by changing state information of the state machine 260 based on whether the motion is present. For example, in a case in which any one of the global motion and the local motion is determined to be present, the MD RTA module 230 may convert the operation mode from the motion detection mode to an object detection mode by transmitting a signal that changes the state information of the state machine 260. In an example, the MD RTA module 230 may correspond to the determination module 131 illustrated in FIG. 1.

When the operation mode is converted to the object detection mode, the image sensor 200 may operate in a manner as illustrated in FIG. 2B. In the object detection mode, the preprocessing/ADC module 210, the frame adjustment module 240, the face presence detector 250, and the state machine 260 may be activated.

For example, in a case in which the image sensor 200 is an AON image sensor that operates permanently, the motion detection module 220 and the face presence detector 250 may operate with ultra-low power, and thus the resolution, the frame rate, and the image quality of the image frames obtained from the image sensor 200 may be degraded compared to a general camera. In addition, for object detection, the smaller the size of a target object in an image frame, the smaller the amount of information in the image, and thus a detection success rate may be reduced. As a result, detection accuracy of the face presence detector 250 may decrease because a small face image captured from a long distance may correspond to a low-resolution and low-quality image frame.

In an example, in a case in which a neural network trained to recognize and detect a target object is a convolution neural network (CNN) and a reduction in the amount of computation is needed to perform object recognition, a convolution operation may be performed with a stride of 1 or greater being in initial layers of the CNN, or an image reduction operation may be performed through pooling-based sub-sampling. In this example, when the convolution operation and/or the image reduction operation described above is applied to a low-resolution and low-quality image frame to be applied to the face presence detector 250 to reduce the size of the image frame, a loss of information may increase, and object detection accuracy may further decrease.

In addition, depending on how the image sensor 200 is used, an image frame may be obtained with the image sensor 200 or a camera being rotated on roll. In such a case, an output value of an inertial measurement unit (IMU) sensor may not be used due to the characteristics of the image sensor 200 that operates without using an application processor of a user terminal. When the roll-rotated image frame is used to detect a target object without being aligned in an upright detection, accuracy in the detection may decrease. For example, in a case in which a neural network of the face presence detector 250 is a model with high capacity, processing may be performed robustly against the roll-rotated image frame. However, in a case in which the neural network of the face presence detector 250 is a model with low capacity provided in a ROM to be operatable in an MCU, such robust processing may not be readily performed due to an increase in memory size and power consumption.

In an example, however, the image sensor 200 of one or more embodiments may adaptively adjust an input of the face presence detector 250 by adjusting at least a portion of image frames through FW in the object detection mode, and thus the image sensor 200 of one or more embodiments prevent the detection accuracy from being reduced by a degraded image frame and a low-resolution and low-quality image frame.

Referring to FIG. 2B, the image sensor 200 may operate in an object detection mode that uses a relatively great amount of computation.

In the object detection mode, the image sensor 200 may adjust at least a portion of a target frame in which a motion is present, determine whether a target object (e.g., a user's face) is present in the adjusted portion, and generate a trigger signal for an application processor. The image sensor 200 may perform an operation in the object detection mode through SW such as FW, thereby reducing power consumption.

In the object detection mode, the image sensor 200 may transmit, to the frame adjustment module 240, image frames of which image quality is improved and converted to a digital signal through the preprocessing/ADC module 210. The frame adjustment module 240 may adjust the portion of the target frame in which the motion is detected among the image frames.

Figure 3:
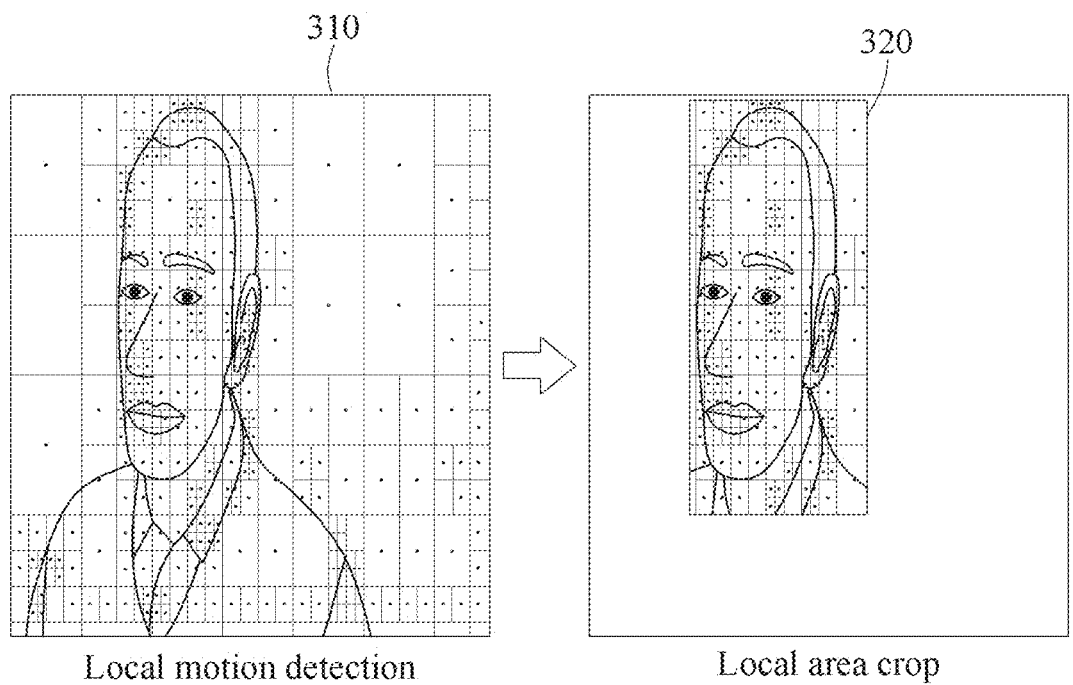
FIG. 3 illustrates an example of an operation of an adjustment module of an image sensor.

For example, as illustrated in FIG. 3, the frame adjustment module 240 may extract a target portion 320 by performing a crop operation on a portion corresponding to a local motion in a target frame 310. The frame adjustment module 240 may improve illuminance and/or backlighting of the target portion 320 using pixel information of the target portion 320. Also, the frame adjustment module 240 may rotate the target portion 320 based on a global motion in the target frame 310. A non-limiting example method of adjusting a target portion of a target frame by the frame adjustment module 240 will be described in further detail with reference to FIG. 3.

The frame adjustment module 240 may transmit, to the face presence detector 250, the target portion 320 that is adjusted in various ways. The face presence detector 250 may detect whether a face of a user is present from the adjusted target portion 320. When the face is detected to be present, the face presence detector 250 may generate a trigger signal for the application processor by changing state information of the state machine 260 based on whether the face is present.

According to examples, the frame adjustment module 240 may be configured in HW. For example, in a case in which only a one-channel grey image (or y-frame) is used for power efficiency, various preprocessing modules (e.g., a front-end image signal process (ISP), binning/scalar, gamma correction, face presence detection preprocessing, etc.) for image quality improvement may be added to a HW block (e.g., the AON HW block) or the preprocessing/ADC module 210 of the image sensor 200.

The frame adjustment module 240 may receive, from the preprocessing/ADC module 210, an image frame for which HW preprocessing is completed along with motion information generated by the motion detection module 220 to perform image adjustment.

The frame adjustment module 240 may transmit the adjusted image to the face presence detector 250 and generate a timing generator (TG)/ISP setting signal or a trigger signal for the application processor. A non-limiting example operation of an image sensor including various HW preprocessing modules for improving image quality will be further described in detail with reference to FIG. 5.

FIG. 3 illustrates an example of an operation of an adjustment module of an image sensor. In the example of FIG. 3, illustrated are the target frame 310 in which a local motion is detected and the target portion 320 that is cropped from the target frame 310 based on the local motion.

For example, in a case in which a face, which is a target object, in an image frame is small and the image frame is used as its original form without an adjustment, the face may not be successfully detected due to a small amount of information. Also, in a case in which a reduction operation (e.g., a stride convolution operation, a pooling operation, etc.) is performed on the image frame, a loss of information may increase further, and detection accuracy may decrease further accordingly.

In an example, however, when a partial image such as a face area in which a local motion is present in the target frame 310 may be extracted and object detection may be performed thereon by an image sensor of one or more embodiments, a neural network configured to detect an object may thus intensively process a portion of an image that is considered significant. Also, the neural network may detect the object without the image sensor of one or more embodiments reducing an image size of the target frame 310, and thus a risk of information loss may be reduced or eliminated and a detection rate may thereby be improved.

To improve a recognition rate for object detection, the image sensor of one or more embodiments may adjust the target frame 310 before recognition is performed. For example, in a case of low illumination of the target portion 320, the image sensor may adjust the brightness of the target portion 320 through the brightness correction operation on the target portion 320. The brightness correction operation may be performed by, for example, the contrast stretching technique, the histogram equalization technique, and/or the mean translation technique that are described above. The mean translation technique may be a method of improving contrast by performing normalization that uses a mean and a standard deviation of each image pixel.

For example, for an image frame that is captured with the background being extremely bright and a face of a user (or a target object) being dark in a backlighting environment, an effect of improving contrast by the mean translation technique of a face area may not be great. When the target portion 320 with a local motion, in lieu of the entire image frame, is extracted by the image sensor of one or more embodiments, a bright portion of the background in the image frame may be mostly removed, the mean of pixel values corresponding to the target portion 320 may decrease, and thus the brightness correction effect of the mean translation technique may increase.

In addition, the image sensor may estimate rotation information and/or movement information of the image sensor or a camera based on global motion information detected or sensed by a motion detection module. The image sensor may detect the target object included in the target portion 320 by compensating and correcting the image frame using the estimated information. The image sensor of one or more embodiments may adjust the image frame in an upright direction through the compensation for the rotation information and thus allow a neural network to detect the object aligned in the upright direction, except for when the object, for example, a face, is in all directions, thereby improving an object detection rate even when a neural network with a small capacity is used.

Figure 4:
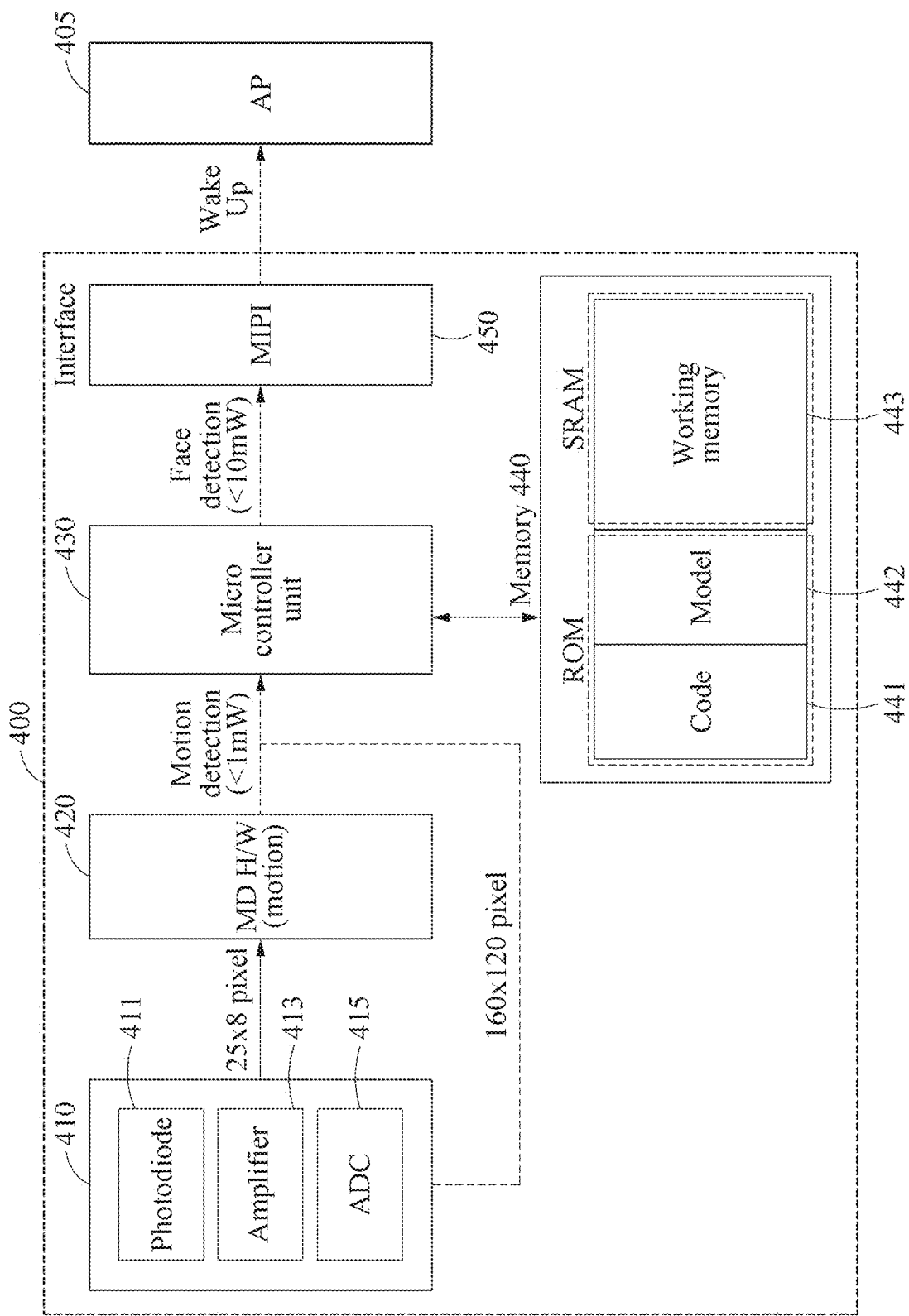
FIG. 4 illustrates an example of an image sensor.

FIG. 4 illustrates an example of an image sensor. Referring to FIG. 4, an image sensor 400 may transmit a trigger signal that wakes up an application processor (AP) 405 of a user terminal when the image sensor 400 operating permanently in the user terminal is turned on and the application processor 405 is in a power-saving state (such as an off-state or an idle state).

In an example, the image sensor 400 may include an image acquisition module 410, a motion detection module 420, an MCU 430, a memory 440, and a mobile industry processor interface (MIPI) 450.

The image acquisition module 410 may include a photodiode 411, an amplifier 413, and an ADC 415. The photodiode 411 may be an optical sensor configured to convert light energy into electrical energy and accurately measure intensity of the light. An analog image signal corresponding to an image frame obtained by the photodiode 411 may be transmitted to the amplifier 413.

The amplifier 413 may amplify the analog image signal of the photodiode 411. The ADC 415 may convert the analog image signal amplified through the amplifier 413 to a digital image signal and transmit the digital image signal to the motion detection module 420. The digital image signal transmitted from the image acquisition module 410 to the motion detection module 420 may correspond to data of 25×8 pixels, for example.

For example, the ADC 415 may transmit data of 160×120 pixels to the MCU 430.

The motion detection module 420 may be configured in HW and detect a motion or movement from the digital signal received from the image acquisition module 410.

The MCU 430 may detect a target object (e.g., a face of a user) by adjusting a portion (e.g., a target portion) in which a motion is detected in the image frame based on the motion or movement detected by the motion detection module 420.

The MCU 430 may detect the target object using a neural network model code 441 stored in a memory 440 and a neural network model 442 trained in advance to detect an object. The neural network model code 441 and the neural network model 442 may be stored in a ROM in the memory 400, for example. A working memory 443 that is used in a process in which the MCU 430 adjusts the portion and detects the target object may be a static random-access memory (SRAM) in the memory 400, for example.

When the target object is detected, the MCU 430 may transmit the trigger signal that wakes up the application processor 405 of the user terminal through the MIPI 450.

For example, that the target object such as the face of the user is detected by the image sensor 400 may correspond to a case in which the user approaches the user terminal with an intent to use the user terminal and the image sensor 400 senses such a motion of the user. In this example, the image sensor 400 may transmit the trigger signal that wakes up the application processor 405 of the user terminal to drive the user terminal that is previously in a power-saving state such as an off-state or an idle state, and thus allow the application processor 405 to perform various requirements of the user.

Figure 5A:
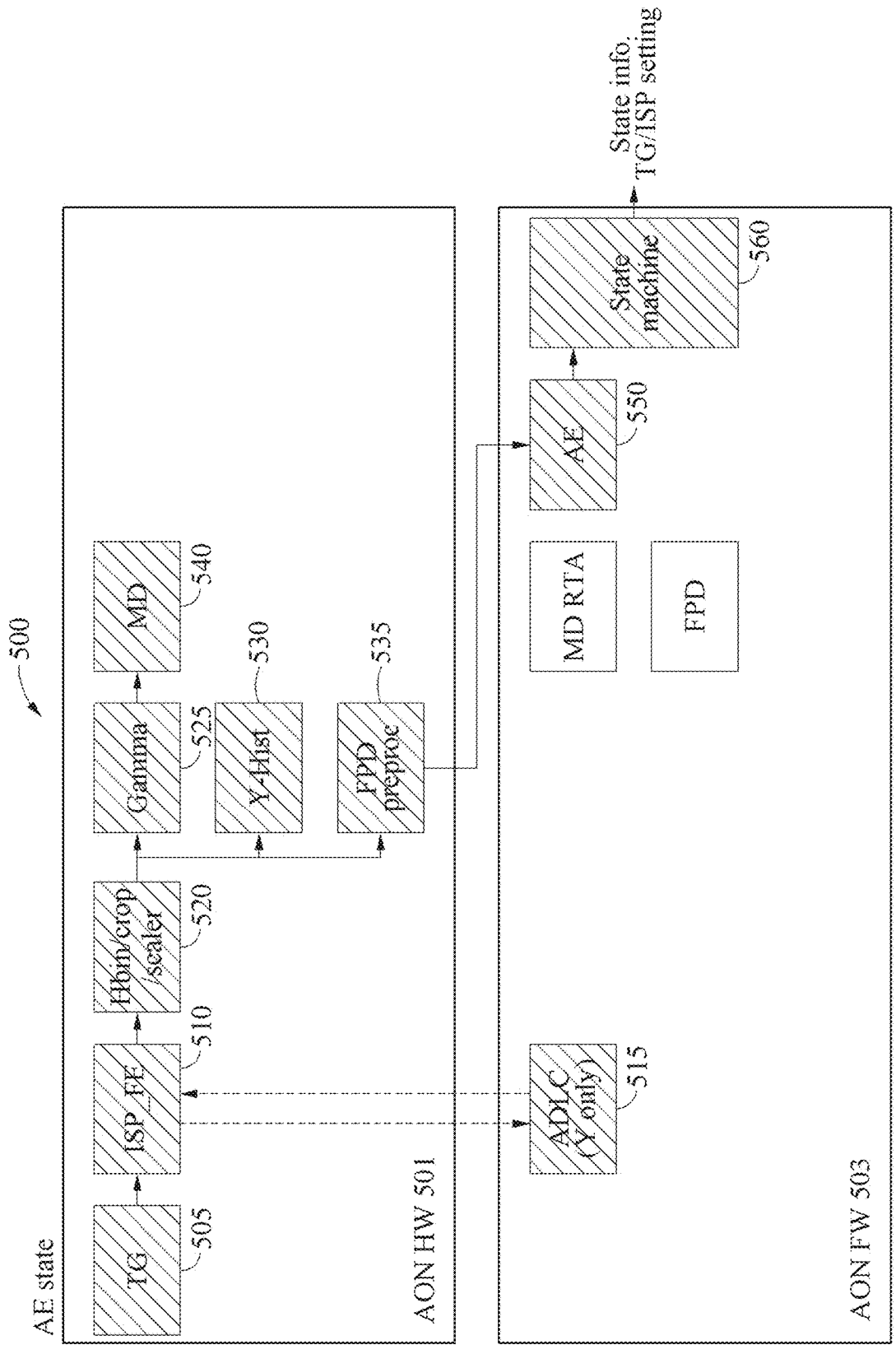
FIGS. 5A through 5C illustrate examples of an operation in each operation mode of an image sensor.
Figure 5B:
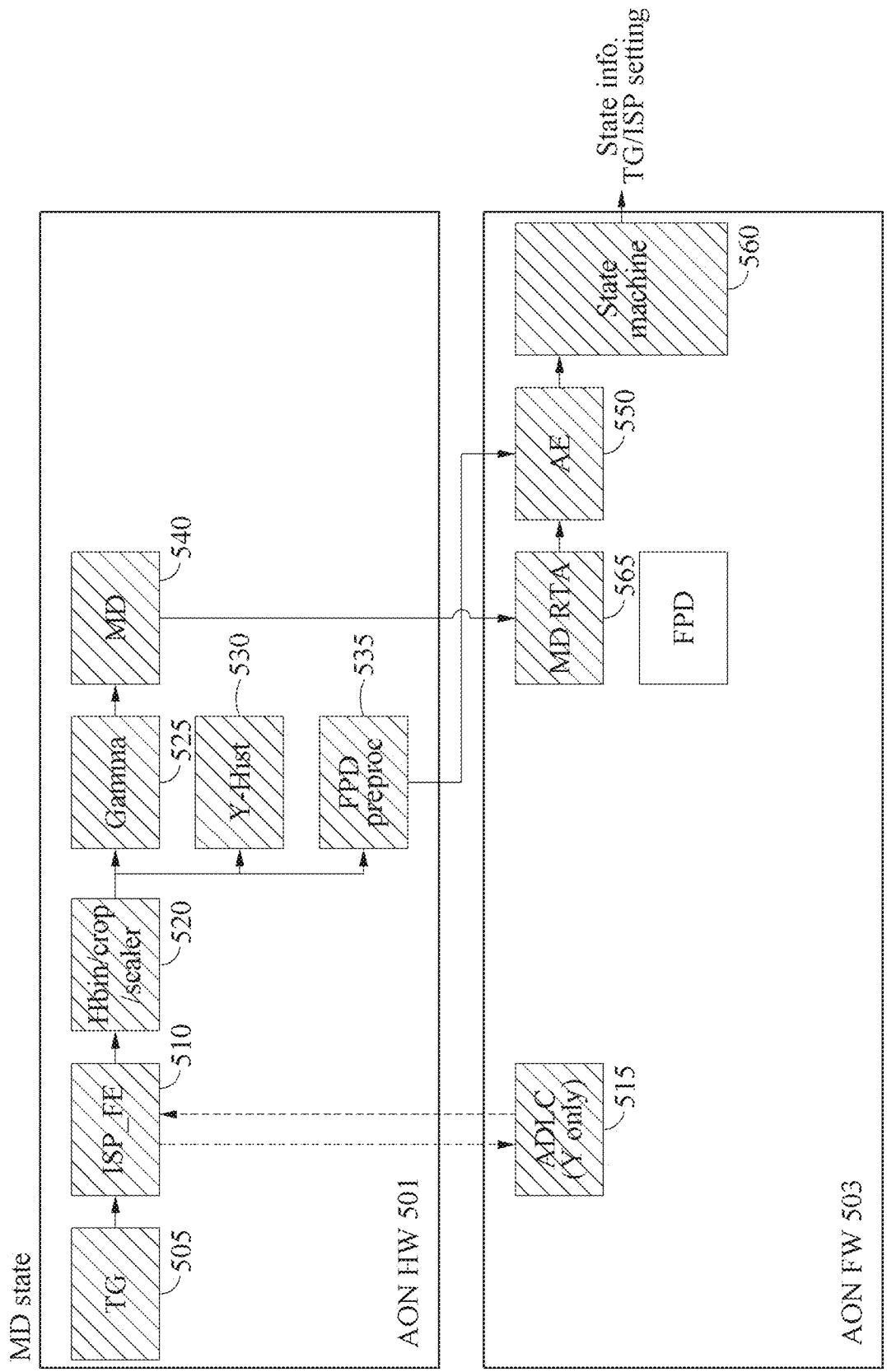
Figure 5C:
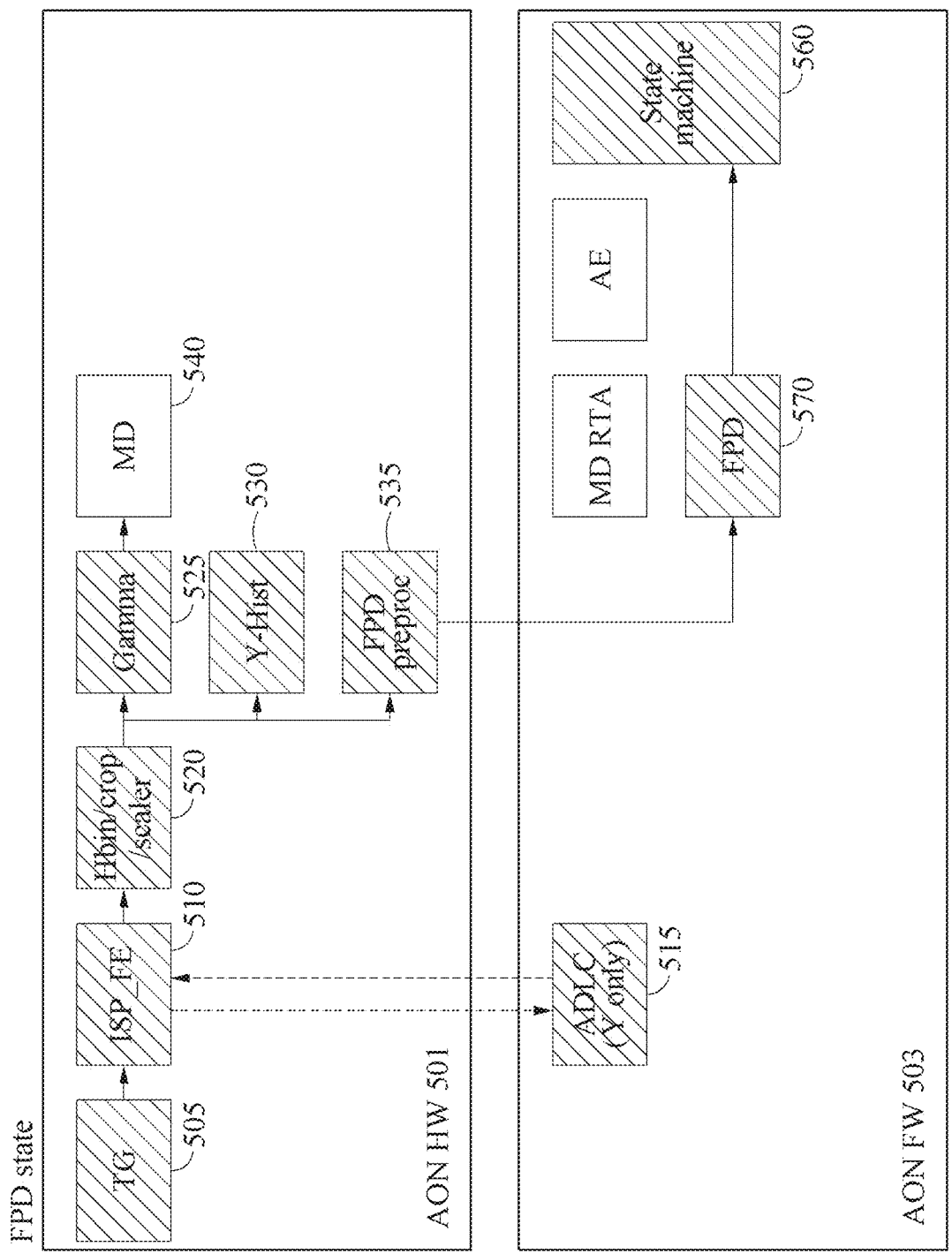

FIGS. 5A through 5C illustrate examples of an operation in each operation mode of an image sensor. Referring to FIGS. 5A through 5C, an image sensor 500 may be divided into a HW block 501 in which components are configured in a form of HW and an FW block 503 in which components are configured in a form of SW. The components included in the FW block 503 may operate in the form of FW in an MCU of the image sensor 500.

The HW block 501 may include a camera module 505, a front-end image signal processor (or ISP_FE) 510, a binning/crop/scalar module 520, a gamma correction module 525, a y-histogram (or y-hist) module 530, a face presence detection (FPD) preprocessing module 535, and a motion detection module 540.

The FW block 503 may include an Auto Dark Level Compensation (ADLC) module 515, an auto exposure (AE) module 550, a state machine 560, an MD RTA module 565, and a face presence detection (FPD) module 570.

The camera module 505 may capture image frames.

The front-end image signal processor 510 may perform image signal processing on the image frames obtained by the camera module 505.

The binning/crop/scalar module 520 may refine data of the image frames in a form that is readily analyzable by performing binning on the data of the image frames, scaling the size of a data value, and changing a vector value of the data to a scalar value. The binning/crop/scalar module 520 may also categorize the data of the image frames into intervals through a binning algorithm that divides discrete data or continuous data into intervals and then categorizes the data. In addition, the binning/crop/scalar module 520 may perform scaling on the size of the data value of the image frames based on the size of a neural network, or convert the vector value of the data to the scalar value.

The gamma correction module 525 may perform gamma encoding that non-linearly transforms a light intensity signal in the image frames using a non-linear transfer function. Gamma used herein may define a relationship between a numerical value of a pixel and an actual luminance, and correspond to a conversion between the sensitivity of human eyes and the sensitivity of a camera. In a case of a digital camera, there may be a linear relationship that, when the number of photons doubled, the strength of a received signal may also be doubled. In contrast, in a case of the human eyes, the signal strength may have a non-linear relationship, which may be corrected by the gamma correction module 525.

The y-histogram module 530 may calculate a histogram obtained by normalizing pixel values (e.g., color values and brightness values of pixels) of an image frame to be between values 0 to 255. For example, relatively high pixel values may be distributed in a histogram of an image frame with a long exposure time, that is, an image frame that is brightly captured. In contrast, relatively low pixel values may be distributed in a histogram of an image frame with a short exposure time, that is, an image frame that is darkly captured.

The FPD preprocessing module 535 may perform preprocessing such as noise removal on an image frame to improve image quality before object detection in the face presence detection module 570.

The motion detection module 540 may correspond to the motion detection circuit 110 described above with reference to FIG. 1, or the motion detection module 220 described above with reference to FIG. 2.

The ADLC module 515 may convert an analog signal to a digital signal, as the ADC described above performs.

The AE module 550 may automatically adjust an exposure time of an image frame and adjust the brightness of the image frame. For example, when the brightness of the image frame is darker than a preset reference, the AE module 550 may adjust the overall brightness of the image frame to be brighter. Conversely, when the brightness of the image frame is brighter than the reference, the AE module 550 may adjust the overall brightness of the image frame to be darker. For example, the AE module 550 may search for a suitable exposure time based on a mean brightness value of pixels to adjust the brightness of the image frame, or use a mean brightness value and/or a median brightness value of an intermediate pixel value among pixel values to adjust the brightness of the image frame.

The state machine 560 may include operations (e.g., converting or maintaining the operation mode of the image sensor) based on state information that changes depending on a signal of the AE module 550, the MD RTA module 565, or the FPD module 570.

The MD RTA module 565 may determine whether a motion is present in an image frame and transmit the signal for converting the operation mode to the state machine 560. The MD RTA module 565 may correspond to the determination module 131 described above with reference to FIG. 1 or the MD RTA module 230 described above with reference to FIG. 2.

The FPD module 570 may detect whether a target object is present. The FPD module 570 may correspond to the object detector 135 described above with reference to FIG. 1 or the face presence detection module 250 described above with reference to FIG. 2.

In the example of FIG. 5A, an operation mode of the image sensor 500 may be set to be an AE mode for adjusting the overall brightness of an image frame. The AE mode may refer to a mode in which preprocessing is performed to remove noise from the image frame and adjust image quality and/or the overall brightness of the image frame before detecting a motion from the image frame and detecting a target object therefrom.

In the AE mode, when the image sensor 500 obtains image frames through the camera module 505, the image sensor 500 may process image signal processing on the obtained image frames through the front-end image signal processor 510. During the image signal processing, the front-end image signal processor 510 may transmit the image frames corresponding to an analog signal to the ADLC module 515 and receive image data converted to digital data from the ADLC module 515. The image data may be transmitted to the binning/crop/scalar module 520 and changed in a form that is easy to be refined and analyzed through the binning/crop/scalar module 520. The data changed by the binning/crop/scalar module 520 may pass through gamma encoding by the gamma correction module 525 and then be transmitted to the motion detection module 540. The motion detection module 540 may detect a motion from the data obtained through the gamma encoding. The motion may include both a global motion based on a movement or a rotation of the camera module 505 and a local motion based on a motion of the target object in the image frames. The data changed by the binning/crop/scalar module 520 may be transmitted to the y-histogram module 530 to be converted in a form of a histogram. The FPD preprocessing module 535 may receive the data converted in the histogram form and perform preprocessing such as noise removal to improve overall image quality of the image frames.

The AE module 550 may receive data for which preprocessing is completed through the FPD preprocessing module 535 and adjust the brightness of the entire image frame.

When the brightness adjustment of the entire image frame is completed, the AE module 550 may change state information of the state machine 560 such that the operation mode is converted. The state machine 560 may transmit the changed state information, camera setting information, and/or ISP setting information to a next operation mode.

In the example of FIG. 5B, the operation mode of the image sensor 500 may be set to be a motion detection mode. For the same operation as in the AE mode, a reference will be made to the description of the AE mode provided above.

In the motion detection mode, the MD RTA module 565 may determine whether a motion is present by receiving a result of detecting, by the motion detection module 540, a motion from data obtained through gamma encoding. The MD RTA module 565 may determine whether the motion is present and transmit a signal for converting the operation mode to the state machine 560. The state machine 560 may transmit state information to a next operation mode.

Referring to FIG. 5C, the operation mode of the image sensor 500 may be set to be a face presence detection mode.

In the face presence detection mode, the FPD module 570 may receive the data completed with the preprocessing performed to improve the image quality of the entire image frame from the FPD preprocessing module 535 and detect whether the target object is present. When the presence or absence of the target object is detected, the FPD module 570 may generate a trigger signal for an application processor and transmit the signal, and then change state information of the state machine 560.

Figure 6:
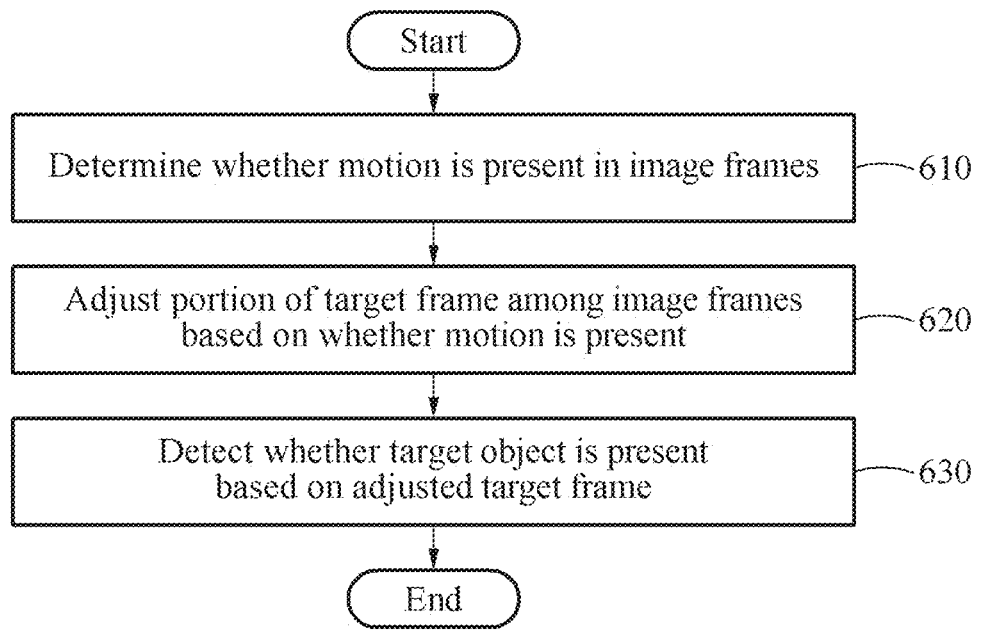
FIGS. 6 and 7 illustrate examples of an operating method of an image sensor.

FIG. 6 illustrates an example of an operating method of an image sensor. Operations to be described hereinafter may be performed sequentially, but not be necessarily performed sequentially. For example, the order of the operations may be changed, and at least two of the operations may be performed in parallel.

Referring to FIG. 6, a target object may be detected by an image sensor through operations 610 to 630 to be described hereinafter.

In operation 610, the image sensor may determine whether a motion is present in image frames.

In operation 620, the image sensor may adjust at least a portion of a target frame among the image frames based on the presence or absence of the motion determined in operation 610. For example, the adjustment of the portion of the target frame may include performing any one or any combination of a crop operation for extracting a target portion corresponding to a local motion in the target frame, a brightness correction operation on the target portion using pixel information of the target portion, and a rotation operation on the target portion of the target frame based on a global motion in the target frame.

The brightness correction operation may be performed by, as non-limiting examples, a contrast stretching technique, a histogram equalization technique, and/or a mean translation technique.

For example, the image sensor may estimate a rotation angle of the image sensor based on the global motion in the target frame, and perform the rotation operation by rotating the target frame to be in an upright position based on the rotation angle.

In operation 630, the image sensor may detect whether the target object is present based on the portion of the target frame which is adjusted in operation 620. The image sensor may convert an operation mode from a first mode (e.g., a motion detection mode) to a second mode (e.g., an object detection mode) by changing state information of a state machine based on whether the motion is present. Alternatively, the image sensor may detect whether the target object is present from the adjusted target frame in operation 620 using a neural network trained to detect whether the target object is present. The target object may be, for example, either one of a user's face and a QR code, but examples of which is not limited thereto.

The image sensor may generate a trigger signal for an application processor based on the presence or absence of the target object detected in operation 630.

Figure 7:
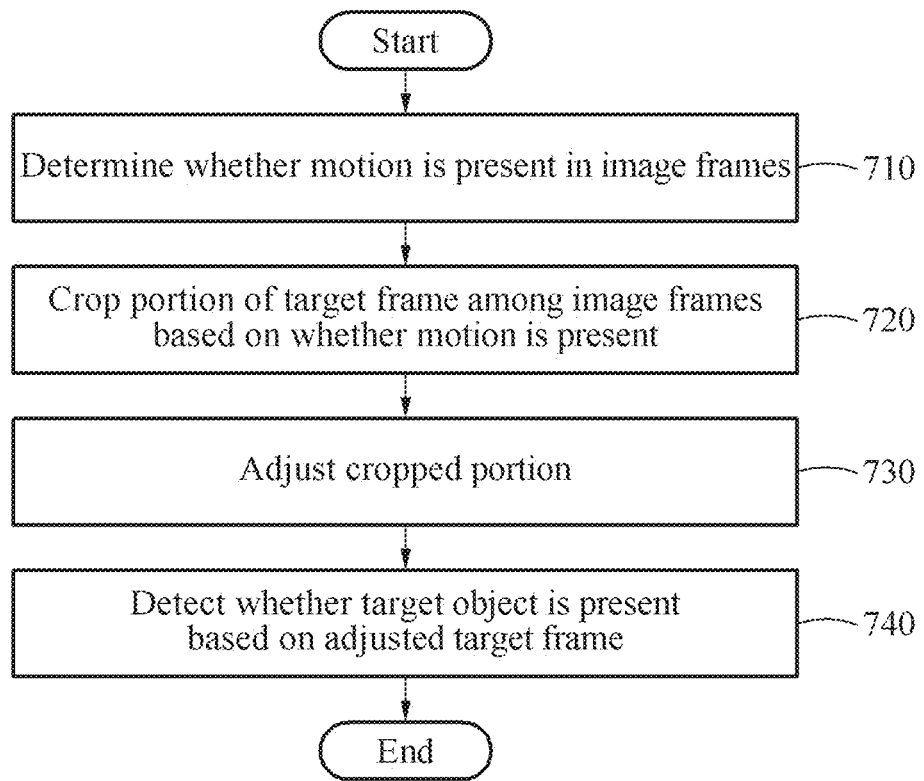

FIG. 7 illustrates another example of an operating method of an image sensor. Operations to be described hereinafter may be performed sequentially, but not be necessarily performed sequentially. For example, the order of the operations may be changed, and at least two of the operations may be performed in parallel.

Referring to FIG. 7, a target object may be detected by an image sensor through operations 710 to 730 to be described hereinafter.

In operation 710, the image sensor may determine whether a motion is present in image frames.

In operation 720, the image sensor may crop at least a portion of a target frame among the image frames based on the presence or absence of the motion determined in operation 710.

In operation 730, the image sensor may adjust the cropped portion of the target frame obtained in operation 720.

In operation 730, the image sensor may perform a brightness correction operation on the cropped portion to improve illuminance and/or backlighting. The image sensor may perform the brightness correction operation on the cropped portion using, for example, a contrast stretching technique, a histogram equalization technique, and/or a mean translation technique. Also, in operation 730, the image sensor may perform a rotation operation on the cropped portion based on a global motion in the target frame such that a top and a bottom of the cropped portion is aligned in an upright direction.

In operation 740, the image sensor may detect whether a target object is present based on the portion of the target frame which is adjusted in operation 730.

The image sensor may generate a trigger signal for an application processor based on the presence or absence of the target object detected in operation 730.

Figure 8:
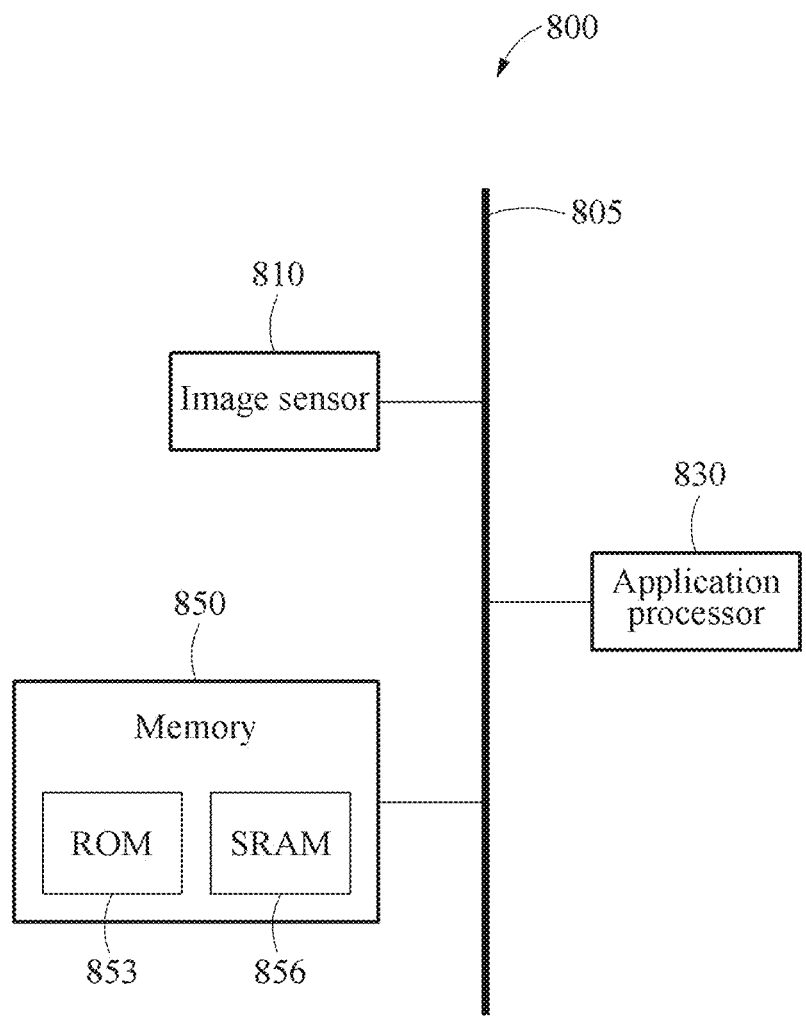
FIG. 8 illustrates an example of a configuration of a user terminal.

FIG. 8 illustrates a configuration of a user terminal. Referring to FIG. 8, a user terminal 800 may include an image sensor 810, an application processor 830 (e.g., one or more application processors), and a memory 850 (e.g., one or more memories). The image sensor 810, the application processor 830, and the memory 850 may be connected to one another through a communication bus 805.

The image sensor 810 may detect or sense a motion in image frames. The image sensor 810 may adjust at least a portion of a target frame among the image frames based on whether the motion is detected. The image sensor 810 may detect whether a target object is present based on the adjusted portion of the target frame and generate a trigger signal. The image sensor 810 may correspond to the image sensor 100 described above with reference to FIG. 1 and perform at least one of the operations or methods described above with reference to FIGS. 1 through 7.

The application processor 830 may be activated by the trigger signal that is generated by the image sensor 810 and then perform various application programs.

The application processor 830 may be a hardware-implemented processing device having a physically structured circuit to execute desired operations. For example, the desired operations may include code or instructions in a program. For example, the hardware-implemented processing device may include a microprocessor, a central processing unit (CPU), a graphics processing unit (GPU), a processor core, a multi-core processor, a multiprocessor, an application-specific integrated circuit (ASIC), a field-programmable gate array (FPGA), a neural processing unit (NPU), and the like.

The application processor 830 may execute a program and control the user terminal 800. A program code to be executed by the application processor 830 may be stored in the memory 850.

The memory 850 may include a ROM 853 and an SRAM 856. The ROM 853 may store a code or a neural network model trained to detect whether the target object is present.

The SRAM 856 may be used as a working memory for operations to be performed by the application processor 830 and store the various application programs. The memory 850 may store various types of information generated in the processing of the image sensor 810 and/or the application processor 830. The memory 850 may also store various types of data and programs. The memory 850 may include a mass storage medium such as a hard disk to store the various types of data.

The user terminal 800 may include devices in various fields, for example, an advanced driver assistance system (ADAS), a head-up display (HUD), a three-dimensional (3D) digital information display (DID), a navigation device, a neuromorphic device, a 3D mobile device, a smartphone, a smart home appliance (e.g., a smart TV, a smart refrigerator, a smart washing machine, etc.), a smart vehicle, an Internet of Things (IoT) device, a medical device, a measurement device, and the like. The 3D mobile device may be understood to include, for example, a display device configured to display augmented reality (AR), virtual reality (VR), and/or mixed reality (MR), a head-mounted display (HMD), a face-mounted display (FMD), AR glasses, and the like.

In FIG. 8, the user terminal 800 may further include a display and a communication interface. The display may be a touch display or a flexible display, but is not limited thereto.

The image sensor, image sensors, motion detection circuits, MCUs, determination modules, adjustment modules, object detectors, preprocessing/ADC modules, motion detection modules, MD RTA modules, frame adjustment modules, face presence detectors, state machines, processors, image acquisition modules, photodiodes, amplifiers, ADCs, memories, working memories, MIPIs, HW blocks, camera modules, front-end image signal processors, binning/crop/scalar modules, gamma correction modules, y-histogram modules, FPD preprocessing modules, FW blocks, ADLC modules, AE modules, face presence detection modules, user terminals, communication buses, application processors, ROMs, SRAMs, image sensor 100, motion detection circuit 110, MCU 130, determination module 131, adjustment module 133, object detector 135, image sensor 200, preprocessing/ADC module 210, motion detection module 220, MD RTA module 230, frame adjustment module 240, face presence detector 250, state machine 260, image sensor 400, processor 405, image acquisition module 410, photodiode 411, amplifier 413, ADC 415, motion detection module 420, MCU 430, memory 440, working memory 443, MIPI 450, image sensor 500, HW block 501, camera module 505, front-end image signal processor 510, binning/crop/scalar module 520, gamma correction module 525, y-histogram module 530, FPD preprocessing module 535, motion detection module 540, FW block 503, ADLC module 515, AE module 550, state machine 560, MD RTA module 565, face presence detection module 570, user terminal 800, communication bus 805, image sensor 810, application processor 830, memory 850, ROM 853, SRAM 856, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An image sensor, comprising:
   a motion detection circuit configured to detect a motion in image frames; and
   a micro control unit (MCU) configured to:
      based on whether the motion is detected, adjust at least a portion of a target frame among the image frames through performance of a determination of a target portion, of the target frame, that corresponds to a detected local motion in the target frame, and a rotation operation on the determined target portion to generate an adjusted target portion; and
      detect, using the adjusted target portion, whether a target object is present in the adjusted target portion,
   wherein the MCU is configured to:
      estimate a rotation angle of the image sensor based on a global motion; and
      perform the rotation operation through a rotation of the determined target portion to be in an upright position based on the rotation angle.

2. The image sensor of claim 1, wherein the MCU comprises:
   a determination module configured to perform the detection of the motion and convert an operation mode;
   an adjustment module configured to perform the adjustment of the portion of the target frame in response to the motion being detected; and
   an object detector configured to perform the detection of whether the target object is present.

3. The image sensor of claim 2, wherein the determination module is configured to convert the operation mode by changing state information of a state machine in response to the motion being detected.

4. The image sensor of claim 2, wherein the adjustment of the portion of the target frame comprises performance of any one or any combination of:
   the determination of the target portion through performance of a crop operation to extract the target portion, from the target frame, corresponding to the detected local motion in the target frame; and
   a brightness correction operation on the determined target portion using pixel information of the determined target portion.

5. The image sensor of claim 1, wherein the detection of whether the target object is present includes use of an object detection neural network based on the adjusted target frame.

6. The image sensor of claim 1, wherein the motion detection circuit is configured to detect either one of or both of:
   the global motion based on a movement of the image sensor and a motion of the image sensor; and
   for the detection of the motion in the image frames, the local motion based on a motion of the target object in the image frames.

7. The image sensor of claim 6, wherein, for the detection of the local motion, the motion detection circuit is configured to:
   calculate a motion field based on a first image frame corresponding to a first time and a second image frame corresponding to a second time after the first time among the image frames; and
   determine the target a portion in which the local motion is observed in the motion field.

8. The image sensor of claim 1, comprising either one of or both of:
   a preprocessing circuit configured to perform preprocessing for image quality improvement on the image frames; and
   an analog-to-digital converter (ADC) configured to convert an analog signal of the image frames to a digital signal.

9. The image sensor of claim 1, wherein the target object comprises either one of a user's face and a quick response (QR) code.

10. The image sensor of claim 1, wherein the MCU is configured to:
    perform the detection of whether the target object is present in the determined target portion based on a converting of an operation mode from a first mode to a second mode in response to the motion being detected; and
    generate a trigger signal for an application processor in response to the target object being detected present in the adjusted target portion.

11. An image sensor, comprising:
    a motion detection circuit configured to detect a motion in image frames; and
    a micro control unit (MCU) configured to:
       based on whether the motion is detected, adjust at least a portion of a target frame among the image frames by performing a rotation operation on the portion of the target frame, and
       detect whether a target object is present based on the adjusted portion of the target frame,
    wherein the MCU is configured to:
       estimate a rotation angle of the image sensor based on a global motion;
       rotate a target portion corresponding to a local motion in the target frame to be in an upright position based on the rotation angle;
       determine whether the target object is present in the target frame by converting an operation mode from a first mode to a second mode in response to the motion being present; and
       generate a trigger signal for an application processor in response to the target object being present.

12. A user terminal, comprising:
an image sensor comprising a motion detection circuit configured to detect a motion in image frames, and a micro control unit (MCU) configured to, based on whether the motion is detected, adjust at least a portion of a target frame among the image frames by performing a rotation operation on the portion of the target frame, and detect whether a target object is present based on the adjusted portion of the target frame, wherein the MCU is configured to estimate a rotation angle of the image sensor based on a global motion, and rotate a target portion corresponding to a local motion in the target frame to be in an upright position based on the rotation angle;
an application processor configured to be activated by a trigger signal; and
a memory configured to store a trained neural network model,
wherein the MCU is configured to:
generate the trigger signal; and
detect whether the target object is present using the trained neural network.

13. A user terminal, comprising:
an image sensor configured to
detect a motion in image frames,
based on whether the motion is detected, adjust at least a portion of a target frame among the image frames by performing a rotation operation on the portion of the target frame,
detect, whether a target object is present based on the adjusted portion of the target frame, using a neural network model trained to detect whether the target object is present, and
generate a trigger signal,
wherein the image sensor is configured to:
estimate a rotation angle of the image sensor based on a global motion; and
rotate a target portion corresponding to a local motion in the target frame to be in an upright position based on the rotation angle;
an application processor configured to be activated by the trigger signal; and
a memory configured to store the neural network model.

14. A user terminal of claim 13, wherein the image sensor comprises:
a determination module configured to determine whether the motion is present and convert an operation mode;
an adjustment module configured to adjust the portion of the target frame in response to the motion is present; and
an object detector configured to detect whether the target object is present based on the adjusted target frame.

15. A user terminal of claim 13, wherein the user terminal comprises at least one of an advanced driver assistance system (ADAS), a head-up display (HUD), a three-dimensional (3D) digital information display (DID), a navigation device, a neuromorphic device, a 3D mobile device, a smartphone, a smart home appliance (e.g., a smart TV, a smart refrigerator, a smart washing machine, etc.), a smart vehicle, an Internet of Things (IoT) device, a medical device, and a measurement device.

* * * * *